United States Patent [19]

Ludwig

[11] Patent Number: 5,087,534
[45] Date of Patent: Feb. 11, 1992

[54] GAS-RECIRCULATING ELECTRODE FOR ELECTROCHEMICAL SYSTEM

[75] Inventor: Frank A. Ludwig, Palos Verdes, Calif.

[73] Assignee: Hughes Aircraft Company, Los Angeles, Calif.

[21] Appl. No.: 542,380

[22] Filed: Jun. 22, 1990

[51] Int. Cl.$^5$ .................................... H01M 8/04
[52] U.S. Cl. ...................... 429/11; 429/17; 429/34
[58] Field of Search ......................... 429/11, 17, 34

[56] References Cited

U.S. PATENT DOCUMENTS

| | | | |
|---|---|---|---|
| 3,231,426 | 1/1966 | Ludwig et al. | 429/11 X |
| 3,282,834 | 11/1966 | Justi et al. | 429/17 X |
| 4,044,193 | 8/1977 | Petrow et al. | 429/40 |
| 4,166,143 | 8/1979 | Petrow et al. | 429/42 X |
| 4,293,396 | 10/1981 | Allen et al. | 204/106 |
| 4,478,696 | 10/1984 | Allen | 204/105 R |
| 4,659,634 | 4/1987 | Struthers | 429/17 X |
| 4,677,038 | 6/1987 | Salomon | 429/11 |
| 4,738,904 | 4/1988 | Ludwig et al. | 429/17 |

Primary Examiner—Stephen J. Kalafut
Attorney, Agent, or Firm—Mary E. Lachman; W. J. Streeter; W. K. Denson-Low

[57] ABSTRACT

An electrode apparatus for use in an electrochemical cell, which permits hydrogen gas generated at the cathode to be recirculated directly to the anode. The electrode apparatus comprises:

(a) an ion-permeable membrane separating the anode and cathode compartments and liquids contained therein;

(b) hydrogen electrodes (cathode and anode) in their respective compartments and in contact with the membrane, comprising a porous hydrophobic catalytic structure which permits the passage of hydrogen gas both along and perpendicular to the longitudinal surface of the electrode, and having an external portion extending outside of the elctrode compartment and exposing the edge surface of the electrode; and (c) a gas chamber connected to the external portions of the electrodes and providing for transfer of gas from the cathode directly to the anode.

Hydrogen gas generated at the cathode passes through the cathode and along the length thereof to the edge surface thereof, into the gas chamber, and then to the edge surface of the anode and along and through the length of the anode. Thus, hydrogen gas from the cathode is recirculated to replenish hydrogen consumed at the anode during operation of the electrochemical cell.

22 Claims, 1 Drawing Sheet

GAS-RECIRCULATING ELECTRODE FOR ELECTROCHEMICAL SYSTEM

BACKGROUND OF THE INVENTION

1. Field of the Invention

The present invention relates generally to batteries and systems which convert chemical energy into electrical energy by use of a continuous concentration electrochemical cell. More specifically, the present invention relates to an improved gas-recirculating electrode for use in such systems.

2. Description of the Background Art

U.S. Pat. No. 4,738,904, assigned to the present assignee, discloses a thermoelectro chemical system that functions as a low-temperature power converter in which the electrochemical cell reactants are thermally regenerated at a temperature below about 250° C. This type of thermoelectrochemical system basically includes an electrochemical cell having a cathode compartment and an anode compartment. The two compartments have a common ion permeable separation wall which allows ions to pass between the two compartments but prevents the passage of gas. A hydrogen ion reacting cathode and a hydrogen ion and hydrogen gas reacting anode are located within their respective compartments, with the cathode and anode being connectable externally from the system for generation of an electrical voltage and current between the electrodes. Suitable hydrogen ion electrodes comprise silver-palladium, platinized porous carbon polytetrafluoroethylene, metal oxides such as lead oxide or manganese oxide, or a solid polymer electrolyte electrode.

A cathode fluid comprising a chosen Bronsted acid is typically located in the cathode compartment and in contact with the cathode. During one method of operation of the system, hydrogen gas is generated or collected at the cathode and the acid is consumed. The system further includes an anode fluid comprising a chosen Bronsted base which is located in the anode compartment and in contact with the anode. During one method of operation of the system, a cation of the base is generated and the base and hydrogen gas are consumed at the anode. At least one of the components, i.e., acid or base, comprises an organic material.

Because of the relative gas-impermeability of the ion-permeable separation wall, any hydrogen gas generated at the cathode during operation of the system is transferred by means external to the electrochemical cell, to the anode compartment for consumption at the anode during generation of the electrical current. This transfer of hydrogen gas is accomplished by means of a tube directly connecting the anode compartment and cathode compartment, as illustrated by tubing 140 in FIG. 2 of U.S. Pat. No. 4,738,904.

In addition, during operation of the system, the anions of the acid and/or the cations of the base midrate through the ion-permeable separation wall into the anode or cathode compartment, respectively, where they combine with the cation of the base or the anion of the acid to form the corresponding salt. A feature of this system is that the salt is capable of being thermally decomposed at a temperature below about 250° C. to directly form the acid and base as two decomposition products. These products can be separated to regenerate the acid and base.

A thermal regenerator is provided in these systems for thermally converting the salt directly to the acid and base starting materials, at a temperature below about 250° C. deans for transferring the salt from the anode and/or cathode compartment to the thermal regenerator are also provided. Anode recycle means are provided for transferring the base formed in the thermal regenerator back to the anode compartment to replenish the base consumed during operation of the system. Cathode recycle means are also provided for transferring the acid formed in the thermal regenerator back to the cathode compartment to replenish the acid consumed during operation of the system.

The above-described systems are particularly useful because their relatively low temperatures (i.e., below 250° C.) allow them to be used in recovering waste heat in the form of electric power from internal combustion engines, industrial processes, and the like. They can also be used to convert heat from other sources such as solar energy, fossil or nuclear fuel, oil well heads or other geothermal heat sources.

An important consideration in thermoelectrochemical systems, as well as electrochemical systems in general, is the overall efficiency of the system and the useful life. It is therefore desirable to continually search for improvements to such systems in which the performance, efficiency and life of the system are maximized.

SUMMARY OF THE INVENTION

The general purpose of this invention is to provide a new and improved electrode apparatus for use in an electrochemical system, in which the electrode apparatus allows the recirculation of hydrogen gas from the cathode directly to the anode. This electrode apparatus possesses most, if not all, of the advantages of the prior art electrodes and some additional advantages as well.

The above general purpose of this invention is accomplished by providing an electrode apparatus for use in an electrochemical system having an anode compartment containing an anode liquid and a cathode compartment containing a cathode liquid in which gas and ions are produced and consumed in these compartments during generation of electrical current by the system, in which the electrode apparatus comprises:

(a) a membrane separating the anode and cathode compartments and having an anode side and a cathode side of the membrane, and comprising an ion-permeable material which allows the transfer of ions between the cathode side and the anode side of the membrane;

(b) a hydrogen cathode means in the cathode compartment on the cathode side of the membrane and in contact therewith for generating electric current, wherein the cathode means has a major longitudinal surface and a minor edge surface, the cathode means comprises a porous hydrophobic catalytic structure which provides the passage of hydrogen gas along and perpendicular to the longitudinal surface of the cathode means, and an external portion of the cathode means extends outside of the cathode compartment to expose the edge surface of the cathode means;

(c) a hydrogen anode means in the anode compartment on the anode side of the membrane and in contact therewith for generating electric current, wherein the anode means has a major longitudinal surface and a minor edge surface, the anode means comprises a porous hydrophobic catalytic structure which provides the passage of hydrogen gas along and perpendicular to the longitudinal surface of the anode means, and an external portion of the anode means extends outside of the anode compartment to expose the edge surface of the anode means; and (d) a gas chamber connected to the external portions of the anode and cathode means and providing a path for transfer of gas from the cathode means directly to the anode means, wherein hydrogen gas generated at the cathode means passes through the cathode means and along the length thereof to the edge surface of the cathode means, into the gas chamber, and then to the edge surface of the anode means and along and through the length of the anode means, to thereby recirculate hydrogen gas from the cathode means directly to the anode means, to replenish hydrogen gas consumed at the anode means during generation of electric current.

These and many other features and attendant advantages of the present invention will become apparent as the invention becomes better understood by reference to the following detailed description when considered in conjunction with the accompanying drawing.

DESCRIPTION OF THE PREFERRED EMBODIMENTS

Figure 1:
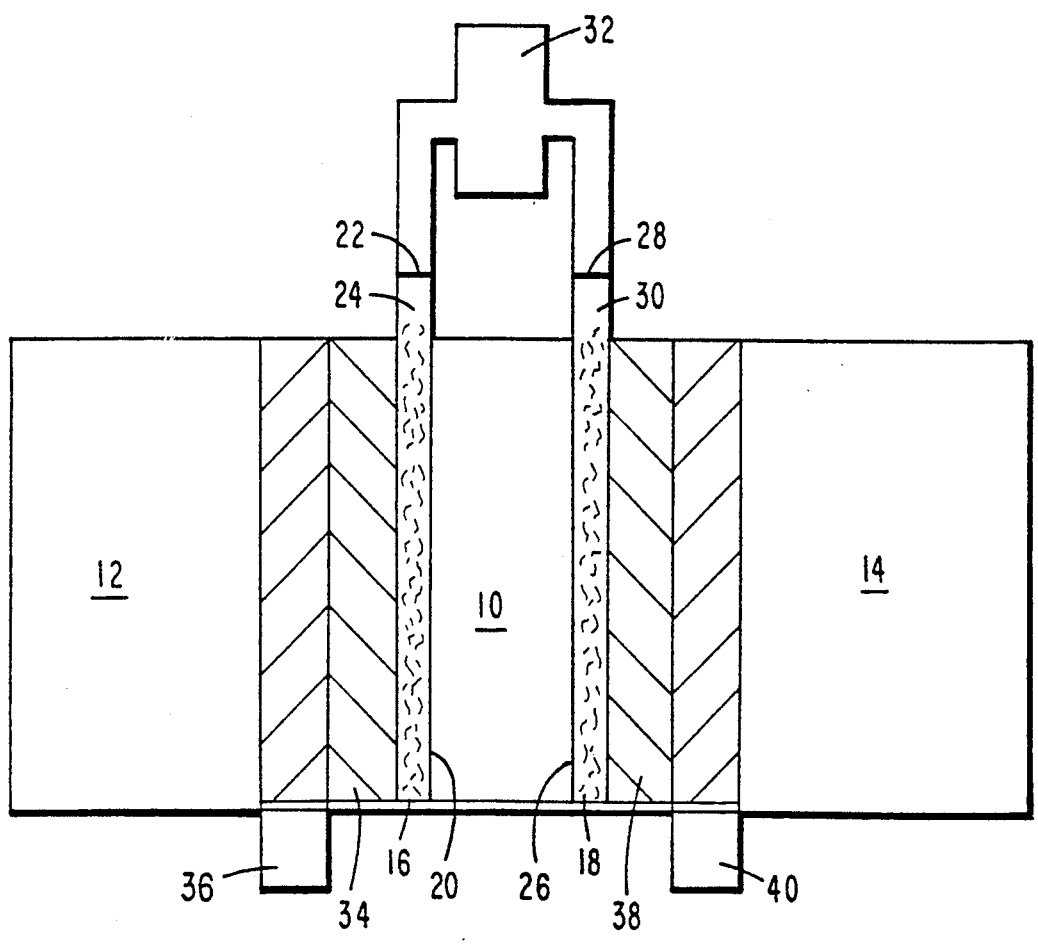
FIG. 1 is a cross-sectional representation of an exemplary electrode apparatus in accordance with the present invention.

The electrode apparatus of the present invention is used in an electrochemical system having an anode compartment containing an anode liquid and a cathode compartment containing a cathode liquid, in which gas and ions are produced and consumed during operation of the system to produce an electrical current. Ad exemplary electrode apparatus in accordance with the present invention is shown in FIG. 1. The apparatus comprises a central membrane 10 that separates the anode compartment 12 from the cathode compartment 14. The membrane 10 comprises a material which readily permits the transport of ions and solvent between the anode and cathode compartments during operation of the electrochemical cell, but is impermeable to gas, within the range of interest for this use. Suitable materials include cation-exchange membranes, anion exchange membranes, and hydrophilic microporous membranes which permit the transport of both cations and anions. The choice of the ion selectivity of the membrane depends on the particular electrochemical cell reaction of interest. Ion permeable membranes include, for example, conventional hydrophilic microporous polymer battery separators comprising, for example, hydrophilic microporous polypropylene. Cation exchange membranes may comprise, for example, Nafion, a trademark of E. I. DuPont de Nemours of Wilmington, Del., and which is a polymer of polytetrafluoroethylene with fluorinated ether side chains terminated with sulfonic acid groups. An example of an anion exchange membrane is an alkali-resistant copolymer of vinyl chloride and acrylonitrile with quaternary nitrogen groups, available from Ionics, Inc. of Watertown, Mass. The side of the membrane 10 which is located in the anode compartment 12 is referred to herein as the "anode side" of the membrane, and the side of the membrane 10 which is located in the cathode compartment 14 is referred to herein as the "cathode side" of the membrane. The membrane 10 is preferably as thin as possible without jeopardizing its structural integrity. Membrane thicknesses within the range of about 1 to 10 mils (0.025 to 0.25 mm) are satisfactory, and thicknesses of less than 5 mils (0.125 mm) are preferred.

The anode side of the membrane 10 is in contact with the anode 16, and the cathode side of the membrane 10 is in contact with the cathode 18. The anode 16 and cathode 18 are both hydrogen ion reacting electrodes, that is, electrodes which react with hydrogen ions or hydrogen gas, as shown below. (For the sake of simplification only the half-cell reactions involving hydrogen gas or hydrogen ions are shown.)
At the anode:

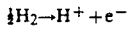

At the cathode:

In accordance with the present invention, the anode and cathode must comprise a porous hydrophobic catalytic structure which permits the passage of hydrogen gas along the longitudinal surface of the structure, as well as perpendicular to the structure, as described below. One such structure comprises carbon fibers, carbon powder, platinum and teflon as described in U.S. Pat. No. 4,478,696 and as manufactured by the Prototech Corporation of Newton Highlands, Mass. This structure permits hydrogen gas to flow through the cathode or anode along the length thereof. The carbon fibers must be treated with a mixture including a non-wetting agent, such as polytetrafluoroethylene, in order to prevent liquid cell reactants from flooding the anode and cathode. Other suitable metal catalysts, such as palladium, tungsten carbide, or nickel, may be used instead of platinum for either the cathode or the anode means. (Nickel is suitable as the acid catalyst provided that the acid solution has a pH of about 4-6). The electrodes are formed by first providing a platinum-on-carbon sample from high surface area (i.e., powdered) carbon and a predetermined amount of catalyst. The platinum-on-carbon sample is compounded with a wet-proofing fluorinated hydrocarbon such as polytetrafluoroethylene, and is formed into a paste. The paste is then coated onto the carbon fibers, which may be in the form of a cloth, and the coated cloth or fibers are heated. The anode and cathode are pressed against the membrane 10, or optionally may be bonded to the membrane 10 by adhesive or thermal compression bonding. Other electrodes which are suitable for practicing the present invention may be formed from a porous substrate material which is coated with a hydrophobic material, to provide channels that are hydrophobic and which permit the flow of gas. The volume of the open space in the porous substrate must be controlled so that the channels formed by the coated fibers are not so large that they merely become filled with liquid, rather than providing for the passage of gas. The electrodes also comprise a hydrogen catalyst, and, optionally, a hydrophilic material, such as carbon powder, which are deposited on the top surface of the substrate.

The anode 16 has a major longitudinal surface 20 defining the length and the area of the anode and a minor edge surface 22 at the extremity of and perpendicular to the longitudinal surface 20. The anode 16 is formed to have an external portion 24 which extends outside of the anode compartment 12 and brings the edge surface 22 out of contact with the liquid in the anode compartment 12. Similarly, the cathode 18 has a major longitudinal surface 26, a minor edge surface 28, and an external portion 30. The anode and cathode preferably have thicknesses within the range of about 0.005 to 0.040 inch (0.013 to 0.10 cm).

The edge surface 22 of anode 16 and the edge surface 28 of cathode 18 are each connected to a gas chamber 32 which is provided to contain hydrogen gas. This connection is achieved using known techniques, such as compressed gasketing (not shown) of teflon (a trademark of E. I. DuPont for a polytetrafluoroethylene). The electrode edges overlap the gasketing by about 0.125 inch (0.32 cm) and the electrode edges are connected completely around their circumferences. No liquid from the anode and cathode compartments must be allowed to contact the edge surfaces of the anode and cathode since wetting of the graphite fibers of the anode and cathode would decrease their effectiveness in transporting hydrogen gas. Since both the anode and cathode are connected to a common gas chamber, this gas chamber provides a path for the transfer of gas from the cathode directly to the anode.

When used in an operating electrochemical cell, the electrode apparatus of the present invention functions as follows. Hydrogen gas that is generated at the cathode 18, as previously described, passes perpendicular to the cathode and then along its longitudinal surface 26 to the edge portion 28. At the edge portion 28, the hydrogen passes from the cathode into the gas chamber 32. In the gas chamber, the hydrogen then contacts the edge portion 22 of the anode 16 and passes along the longitudinal surface 20 of the anode 16 and then perpendicular to the anode 16 along the longitudinal surface 20. This hydrogen is then available for reaction at the anode, as previously described. Thus, in accordance with the present invention, hydrogen gas from the cathode is recirculated directly to the anode to replenish the hydrogen consumed at the anode during the electrochemical cell reaction. The electrodes used in the present invention provide for the conduction of hydrogen gas both along the longitudinal surface of the electrode and perpendicular to the longitudinal surface.

One particular hydrogen ion reacting electrode which has been found useful in practicing the present invention is a solid polymer electrolyte (SPE) electrode, which comprises a structure in which the electrocatalyst, carbon and polytetrafluoroethylene are bonded directly to both sides of a solid polymer ionomer membrane to form the cathode and anode. Such an SPE electrode suitable for use in the electrode apparatus of the present invention may be formed using a membrane of Nafion, which is pressed against electrodes formed from tight weave carbon cloth loaded with Teflon binder, carbon powder, and platinum, such as the electrodes which may be obtained from Prototech Company of Newton Highlands, Mass.

The electrode apparatus in accordance with the present invention may further comprise current collector means in contact with the anode and cathode for collecting electrical current generated during operation of the electrochemical system. As shown in FIG. 1, such a current collector means may comprise, for example, a layer of electronically conductive felt 34, such as conductive graphite, one surface of which contacts the anode 16 and the opposite surface of which contacts an electrically conductive screen 36, such as gold plated on a stainless steel screen. Similarly, the layer of felt 38 contacts the cathode 18 and the conductive screen 40. Optionally, the current collector may comprise tantalum screens embedded in the carbon-teflon matrix of the anode and cathode. Other known current collector means may also be used. Through the current collector means, the anode and cathode are connectable to an external circuit (not shown) for generating an electrical current and voltage. The external circuit can include electric motors or other systems for utilizing the electric energy generated by the electrochemical cell, or batteries or other suitable systems for storing the electric energy generated by the electrochemical cell.

It has been discovered that the performance of the electrode apparatus of the present invention is not overly sensitive to the hydrogen gas pressure in the gas chamber 32 with respect to the liquids in the anode and cathode compartments. Suitable pressures for the hydrogen in the gas chamber are within the range of zero to about 5.0 pounds per square inch (psi) or $35 \times 10^3$ pascals (Pa) above or below the pressure of the liquids in the anode and cathode compartments. It was found that the initial application of slight pressure differentials between the hydrogen gas and the liquids helped establish the presence of both gas and liquid in the cathode and anode. After the initial break-in period, zero differential pressure gave identical performance to slight positive or negative gas pressures. As a practical matter, this insensitivity to pressure differentials is preferred since the maintenance of pressure differentials is obviated.

An electrode apparatus in accordance with the present invention was constructed as follows. The membrane comprised a 1 mil (0.025 mm) thick film of Nafion 1100 obtained from DuPont Corporation of Wilmington, Del. The electrodes (anode and cathode) comprised a tight weave carbon cloth, 15 mils (0.38 mm) thick, heavily loaded with Teflon binder, and containing 0.45 m-g/cm$^2$ of platinum, and were Type 3 electrodes obtained from Prototech Company of Newton Highlands, Mass. The electrodes were pressed against the membrane on either side thereof. The edges of the electrodes, which extended outside of the anode and cathode compartments, overlapped compressed teflon gasketing by about 0.125 inch (0.32 cm); and the edges of the electrodes were connected around their entire circumference to a common hydrogen gas manifold which served as the gas chamber. Liquid was unable to pass through the gasketed edges of the electrodes. The cell fluids comprised lactic acid (LA), diethylamine (DEA) and water ($H_2O$). The anode liquid comprised 0.72:1.0:5.0 mole parts of LA:DEA:$H_2O$. The cathode liquid comprised 1.3:0.5:1.0 mole parts of LA:DEA:$H_2O$. The system was maintained at 70° C. The hydrogen in the gas manifold was initially maintained at a pressure of 9 psig or $62 \times 10^3$ Pa, which was 4 psig or $28 \times 10^3$ Pa below that of the anode and cathode liquids. A current density of 46 milliaxdoeres/centimeter$^2$ (ma/cm$^2$) was achieved at a cell voltage of 0.12 volt at 70° C. The maximum power density was 5.5 milliwatts/centimeter$^2$ (mw/cm$^2$).

Additional tests were performed at 70° C. using the electrode apparatus constructed as described above except that the Nafion membrane had a thickness of 7 mils (0.18 mm) and the cathode liquid comprised 1.19:0.5:1.0 of LA:DEA:$H_2O$. The electrochemical cell (i.e., anode and cathode compartments) were at approximately 15 psig or $10 \times 10^4$ Pa and the hydrogen gas in the gas manifold was initially at approximately 14 psig or $9.6 \times 10^4$ Pa. The cell operated at 26.2 ma/cm$^2$ at 0.180 V at maximum power, yielding 4.7 mw/cm$^2$.

Thus, when the membrane thickness was changed from 1 mil (0.025 mm) to 7 mils (0.18 mm), the power density decreased by only 15 percent. Further, this lower value might be due to the lowered acid concentration rather than the change in membrane thickness.

Further tests in which the temperature of the cell fluids was varied indicated that at 50° C., the maximum power density was approximately 2 mw/cm$^2$, and at 23° C., the maximum power density was approximately 0.6 mw./cnd. Thus it can be seen that at least somewhat elevated temperatures are necessary for optimized performance.

In additional tests, the Type 3 electrode was replaced by a Type 1 electrode also obtained from Prototech Company. The Type 1 electrode was approximately 30 mils (0.76 mm) thick, a very open weave cloth, and contained 0.22 mg/cm$^2$ of platinum. The anode liquid comprised 0.72:1.3:5 of LA:DEA:H$_2$O; and the cathode liquid comprised 2:1:0.5 of LA:DEA:H$_2$O. At 70° C., the maximum power density was only 0.3 mw/cm$^2$. These results indicate the importance of the pore size of electrode structure in accordance with the present invention, as previously discussed.

Thus, it can be seen that the electrode apparatus of the present invention provides for the effective transfer of hydrogen gas directly from the cathode to the anode. The advantage of transferring gas around the membrane in accordance with the present invention rather than through the membrane is that the entire area of the membrane is available for ion passage, thereby improving the power density and efficiency of the electrical output. It is anticipated that the effectiveness of the electrode apparatus of the present invention may be further improved by: (a) optimizing the non-wetting characteristics of the anode and cathode electrodes by varying the type, physical placement, and amount of non-wetting agent used in the electrode fabrication; (b) increasing the temperature in the electrochemical cell; (c) optimizing the contact and/or bonding between the membrane and the electrodes; (d) making the electrodes thinner, for example, within the range of 1 to 4 mils (0.0025 to 0.01 cm); and/or (e) optimizing the electrode composition and structure to accommodate gas flow.

The present invention may be used in any electrochemical system in which hydrogen gas is generated at one electrode and consumed at the other electrode. While the present invention is especially useful in the thermoelectrochemical system of the type described in U.S. Pat. No. 4,738,904, its use is not limited to low temperature applications, use with organic cell fluids, or thermally regenerative systems. Those skilled in the art will recognize that the disclosures within are exemplary only and that various other alternatives, adaptations, and modifications may be made within the scope of the present invention. Accordingly, the present invention is not limited to the specific embodiments as illustrated herein, but is only limited by the following claims.

What is claimed is:

1. An electrode apparatus for use in an electrochemical system having an anode compartment containing an anode liquid and a cathode compartment containing a cathode liquid, in which gas and ions are produced and consumed in said compartments during electrical current generation by said system, wherein said electrode apparatus comprises:

(a) a membrane for separating said anode compartment from said cathode compartment, said membrane having a cathode side and an anode side and comprising an ion permeable material to provide transfer of ions between said cathode side and said anode side of said membrane;

(b) a hydrogen cathode means located in said cathode compartment on said cathode side of said membrane and in contact with said membrane for generating electric current, wherein said cathode means has a major longitudinal surface and a minor edge surface, said cathode means comprises a porous hydrophobic catalytic structure which provides the passage of hydrogen gas along said longitudinal surface of said cathode means and perpendicular to said longitudinal surface of said cathode means, and an external portion of said cathode means extends outside of said cathode compartment, to expose said edge surface of said cathode means;

(c) a hydrogen anode means located in said anode compartment on said anode side of said membrane and in contact with said membrane for generating electric current, wherein said anode means has a major longitudinal surface and a minor edge surface, said anode means comprises a porous hydrophobic catalytic structure which provides the passage of hydrogen gas along said longitudinal surface of said anode means and perpendicular to said longitudinal surface of said anode means, and an external portion of said anode means extends outside of said anode compartment to expose said edge surface of said anode means; and (d) a gas chamber connected to said external portions of said cathode means and said anode means and providing a path for transfer of gas from said cathode means directly to said anode means, wherein hydrogen gas generated at said cathode means passes through said cathode means and along said major longitudinal surface thereof to said edge surface of said cathode means, into said gas chamber, and then to said edge surface of said anode means and along and through said major longitudinal surface of said anode means to thereby recirculate said hydrogen gas from said cathode means directly to said anode means, to replenish said hydrogen gas consumed at said anode means during generation of said electric current.

2. An electrode apparatus as set forth in claim 1 wherein said membrane comprises a solid polymer electrolyte.

3. An electrode apparatus as set forth in claim 2 wherein said membrane comprises a polymer of polytetrafluoroethylene with fluorinated ether side chains terminated with sulfonic acid groups.

4. An electrode apparatus as set forth in claim 1 wherein said cathode means and said anode means each comprise a porous substrate coated with a hydrophobic material and a catalyst.

5. An electrode apparatus as set forth in claim 4 wherein said cathode means and said anode means each comprise fibers of carbon cloth coated with a mixture of polytetrafluoroethylene and carbon powder impregnated with platinum.

6. An electrode apparatus as set forth in claim 4 wherein said catalyst is selected from the group consisting of platinum, palladium, nickel, and tungsten carbide.

7. An electrode apparatus as set forth in claim 4 wherein said cathode means and said anode means each have a thickness within the range of about 0.005 to 0.040 inch (0.013 to 0.10 centimeters).

8. An electrode apparatus as set forth in claim 1 wherein said gas chamber is connected to said edge surfaces of said cathode means and said anode means.

9. An electrode apparatus as set forth in claim 8 further comprising gasket means surrounding said external portions of said cathode means and said anode means at the interface thereof with said cathode compartment and said anode compartment, respectively, to prevent said anode and cathode liquids from contacting said edge surfaces of said cathode means and said anode means.

10. An electrode apparatus as set forth in claim 1 wherein said hydrogen gas in said gas chamber has a pressure higher or lower than said anode and cathode liquids in said anode and cathode compartments.

11. An electrode apparatus as set forth in claim 10 wherein said hydrogen gas has a pressure from zero to about 5.0 pounds per square inch ($3.5 \times 10^4$ pascals) higher or lower than said liquids in said compartments.

12. An electrode apparatus as set forth in claim 1 further comprising current collector means in contact with said cathode means for collecting electrical current generated thereby.

13. An electrode apparatus as set forth in claim 12 wherein said current collector means comprises
   an electrically conductive screen; and
   a layer of electronically conductive felt located between and in contact with said conductive screen and said cathode means.

14. An electrode apparatus as set forth in claim 1 further comprising current collector means in contact with said anode means for collecting electrical current generated thereby.

15. An electrode apparatus as set forth in claim 14 wherein said current collector means comprises:
   an electrically conductive screen; and
   a layer of electronically conductive graphite felt located between and in contact with said conductive screen and said anode means.

16. A method for recirculating hydrogen gas produced during generation of an electrical current in an electrochemical system having an anode compartment and a cathode compartment, comprising:
   (a) providing said electrochemical system comprising said anode compartment and said cathode compartment;
   (b) providing an electrode apparatus comprising:
      (1) a membrane for separating said anode compartment from said cathode compartment, said membrane having a cathode side and an anode side and comprising an ion-permeable material to provide transfer of ions between said cathode side and said anode side of said membrane;
      (2) a hydrogen cathode means located in said cathode compartment on said cathode side of said membrane and in contact with said membrane for generating electric current, wherein said cathode means has a major longitudinal surface and a minor edge surface, said cathode means comprises a porous hydrophobic catalytic structure which provides the passage of hydrogen gas along said longitudinal surface of said cathode means and perpendicular to said longitudinal surface of said cathode means, and an external portion of said cathode extends outside of said cathode compartment to expose said edge surface of said cathode means; and
      (3) a hydrogen anode means located in said anode compartment on said anode side of said membrane and in contact with said membrane for generating electric current, wherein said anode means has a major longitudinal surface and a minor edge surface, said anode means comprises a porous hydrophobic catalyst structure which provides the passage of hydrogen gas along said longitudinal surface of said anode means and perpendicular to said longitudinal surface of said anode means, and an external portion of said anode means extends outside of said anode compartment to expose said edge surface of said anode means;
   (c) permanently incorporating said electrode apparatus into said electrochemical system; and
   (d) connecting said external portion of said anode means and said external portion of said cathode means to a common gas chamber, whereby gas generated at said cathode means passes through said cathode means and along said major longitudinal surface thereof to said edge surface of said cathode means, into said gas chamber, and then to said edge surface of said anode means and along and through said major longitudinal surface of said anode means to thereby recirculate said hydrogen gas from said cathode means directly to said anode means and replenish said hydrogen gas consumed at said anode means during said generation of said electric current.

17. The method of claim 16 wherein said connecting comprises providing gasket means between said gas chamber and said external portions of said anode means and said cathode means to thereby prevent liquid in said anode compartment and said cathode compartment from contacting said edge surfaces of said anode means and said cathode means.

18. The method of claim 16 further comprising maintaining said hydrogen gas in said gas chamber at a pressure which is higher or lower than the pressure in said anode compartment and said cathode compartment.

19. The method of claim 18 wherein said hydrogen gas has a pressure from zero to about 5.0 pounds per square inch ($3.5 \times 10^4$ pascals) higher or lower than the pressure in said compartments.

20. The method as set forth in claim 16 wherein membrane comprises a polymer of polytetrafluoroethylene with fluorinated ether side chains terminated with sulfonic acid groups.

21. The method as set forth in claim 16 wherein said cathode means and said anode means each comprise a porous substrate coated with a hydrophobic material and a catalyst.

22. The method as set forth in claim 21 wherein said cathode means and said anode means each comprise fibers of carbon cloth coated with a mixture of polytetrafluoroethylene and carbon powder impregnated with platinum.

* * * * *